(12) United States Patent
Chan

(10) Patent No.: US 9,772,114 B2
(45) Date of Patent: Sep. 26, 2017

(54) HEAT DISSIPATING STRUCTURE FOR AN IRON-SHEET HOUSE

(71) Applicant: Ya-Ching Chan, Yun Lin Hsien (TW)

(72) Inventor: Ya-Ching Chan, Yun Lin Hsien (TW)

(*) Notice: Subject to any disclaimer, the term of this patent is extended or adjusted under 35 U.S.C. 154(b) by 688 days.

(21) Appl. No.: 14/270,329

(22) Filed: May 5, 2014

(65) Prior Publication Data

US 2015/0060011 A1  Mar. 5, 2015

(30) Foreign Application Priority Data

Sep. 3, 2013  (TW) .............................. 102216509 U

(51) Int. Cl.
| | | |
|---|---|---|
| *E04B 1/80* | (2006.01) | |
| *F24F 7/02* | (2006.01) | |
| *E04D 13/17* | (2006.01) | |
| *A01K 1/00* | (2006.01) | |

(52) U.S. Cl.
CPC .............. *F24F 7/02* (2013.01); *A01K 1/0058* (2013.01); *E04D 13/174* (2013.01)

(58) Field of Classification Search
CPC ......... F24F 7/02; E04D 13/174; A01K 1/0058
USPC ................ 454/242, 243, 260, 364, 365, 366
See application file for complete search history.

(56) References Cited

U.S. PATENT DOCUMENTS

| | | | | |
|---|---|---|---|---|
| 5,970,918 A | * | 10/1999 | Bargy ................... | A01K 63/003 119/246 |
| 6,190,251 B1 | * | 2/2001 | Park ........................ | F23L 17/08 454/35 |
| 6,966,156 B2 | * | 11/2005 | Dixon ....................... | F24F 7/02 454/364 |
| 7,694,467 B2 | * | 4/2010 | Lin ....................... | E04D 13/174 454/364 |
| 2008/0188176 A1 | * | 8/2008 | Hunt ....................... | E04D 13/17 454/366 |

* cited by examiner

Primary Examiner — Gregory Huson
Assistant Examiner — Dana Tighe
(74) Attorney, Agent, or Firm — Symbus Law Group, LLC; Clifford D. Hyra

(57) ABSTRACT

A heat dissipating structure for an iron-sheet house includes two frames fixed to left and right sides of a roof. The frames define a ventilation space in communication with an inside of a house including the roof. Each frame includes a hollow interior, at least one lower opening communicating the hollow interior with an outside of the house, and at least one vent communicating the hollow interior with the ventilation space. The frames are interconnected by connecting members. Two adjacent connecting members respectively have two mutually facing grooves. A shielding plate is mounted between two adjacent connecting members and is fixed to upper ends of the frames to cover the ventilation space, with the shielding plate including front and rear ends respectively engaged in the two mutually facing grooves respectively of the two adjacent connecting members and bonded to the two adjacent connecting members by silicon glue.

2 Claims, 2 Drawing Sheets

HEAT DISSIPATING STRUCTURE FOR AN IRON-SHEET HOUSE

BACKGROUND OF THE INVENTION

This application claims the benefit of Taiwan Utility Model Application Serial No. 102216509 filed Sep. 3, 2013, the entirety of which is herein incorporated by reference.

The present invention relates to a heat dissipating structure for an iron-sheet house and, more particularly, to a heat dissipating structure for an iron-sheet house achieving a natural ventilating/heat dissipating effect to lower the indoor temperature.

In construction of a conventional iron-sheet house, frames are firstly built and then covered by wavy metal sheets. Since iron-sheet houses can be rapidly built, they are widely used in factories, residential houses, and warehouses. However, the roof of the iron-sheet house is directly exposed to the sunlight such that the inside of the iron-sheet house becomes very hot and sultry. To solve the problem of high heat and sultriness, a plurality of holes is provided in the roof of a factory to communicate the inside with the outside, and rotating fans are mounted in the holes and can be driven by the natural wind to achieve a ventilating/heat dissipating effect. However, the holes destroy waterproof layers of the wavy metal sheets, causing rusting of the wavy metal sheets. Furthermore, rainwater will enter the factory via the holes and, thus, causes leakage of water.

BRIEF SUMMARY OF THE INVENTION

An objective of the present invention is to provide a heat dissipating structure for an iron-sheet house achieving a natural ventilating/heat dissipating effect to lower the indoor temperature, reducing consumption of energy and, hence meeting the green construction idea of saving energy and reducing emission of carbon. The residential quality of the building is, thus, increased.

A heat dissipating structure for an iron-sheet house according to the present invention includes two frames adapted to be fixed to left and right sides of a roof. The frames define a ventilation space in communication with an inside of a house including the roof. Each frame includes a hollow interior, at least one lower opening communicating the hollow interior with an outside of the house, and at least one vent communicating the hollow interior with the ventilation space. The frames are interconnected by a plurality of connecting members. Each of the plurality of connecting members includes a groove in at least one side thereof. Two adjacent connecting members respectively have two mutually facing grooves. A shielding plate is mounted between two adjacent connecting members and is fixed to upper ends of the frames to cover the ventilation space, with the shielding plate including front and rear ends respectively engaged in the two mutually facing grooves respectively of the two adjacent connecting members and bonded to the two adjacent connecting members by silicon glue.

Preferably, each frame includes a flat lower edge having first and second sides located on opposite sides of the at least one lower opening. A first dashboard extends downward from the first side of the flat lower edge of each frame. A second dashboard extends downward from the second side of the flat lower edge of each frame. A length of the first dashboard between the flat lower edge of each frame and a bottom of the first dashboard is larger than a length of the second dashboard between the flat lower edge of each frame and a bottom of the second dashboard.

Preferably, each frame includes left and right sidewalls defining the hollow interior. Each of the left and right sidewalls of each frame includes at least two insertion grooves spaced from each other in a vertical direction. An insertion plate is mounted between two aligned insertion grooves respectively of the left and right sidewalls of each frame. Each insertion plate has a plurality of vents. The vents of an upper one of two adjacent insertion plates are not aligned with the vents of a lower one of the two adjacent insertion plates.

Preferably, each insertion plate has substantially slanted L-shaped cross sections and extends downward.

Preferably, each connecting member includes a base and a cover coupled to the base. The base includes two vertical boards protruding toward the cover. Each vertical board has a retaining portion. The cover includes two plates protruding toward the base. Each plate has a hook. Each hook of the cover engages with one of the retaining portions of the base to couple the base to the cover.

The present invention will become clearer in light of the following detailed description of illustrative embodiments of this invention described in connection with the drawings.

DETAILED DESCRIPTION OF THE INVENTION

Figure 1:
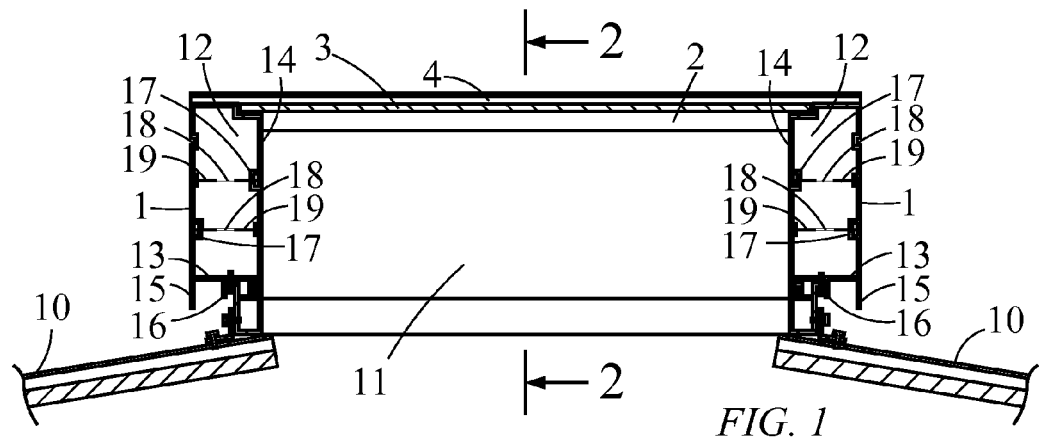
FIG. 1 is a cross sectional view of a heat dissipating structure for an iron-sheet house according to the present invention.
Figure 2:
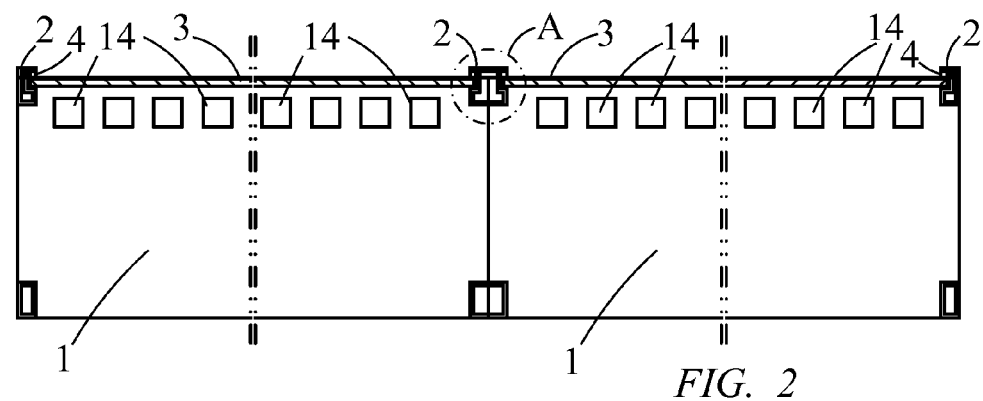
FIG. 2 is a cross sectional view taken along section line 2-2 of FIG. 1.

With reference to FIGS. 1 and 2, a heat dissipating structure for an iron-sheet house includes a plurality of frames 1, a plurality of connecting members 2, and at least shielding plate 3. The frames 1 are adapted to be fixed to left and right sides of a roof 10. Two frames 1 opposite to each other define a ventilation space 11 in communication with an inside of a house including the roof 10. Each frame 1 includes a hollow interior 12, at least one lower opening 13 communicating the hollow interior 12 with an outside of the house, and at least one vent 14 communicating the hollow interior 12 with the ventilation space 11. The heat dissipating structure can include only two frames 1. Since hot air rises when it coexists with cold air, the high-temperature air in the inside of the housing can flow to the outside via the ventilation space 11, the vents 14, the hollow interiors 12, and the lower openings 13 of the frames 1 to reduce the indoor temperature of the housing.

Each frame 1 includes a flat lower edge having first and second sides located on opposite sides of the at least one lower opening 13 thereof. A first dashboard 15 extends downward from the first side of the flat lower edge of each frame 1. A second dashboard 16 extends downward from the second side of the flat lower edge of each frame 1. A length of the first dashboard 15 between the flat lower edge of each frame 1 and a bottom of the first dashboard 15 is larger than a length of the second dashboard 16 between the flat lower edge of each frame 1 and a bottom of the second dashboard 16. Thus, the first dashboard 15 and the second dashboard 16 can stop rainwater and can prevent the rainwater from being blown into the inside of the housing.

Figure 4:
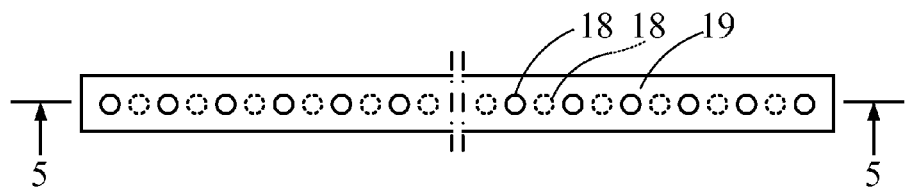
FIG. 4 is a top view of an upper insertion plate and a lower insertion plate.
Figure 5:
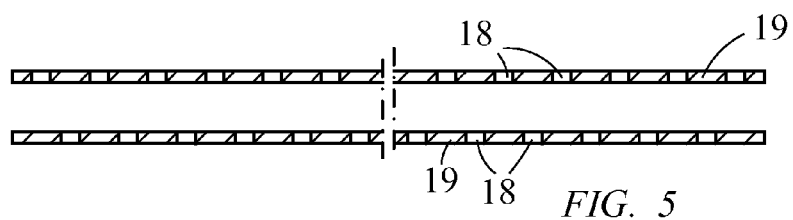
FIG. 5 is a cross sectional view taken along section line 5-5 of FIG. 4.
Figure 6:
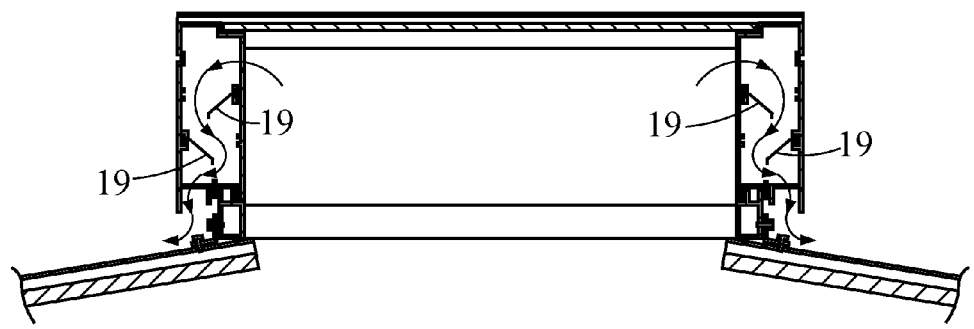
FIG. 6 is a cross sectional view of another example of a waterproof board according to the present invention.

Each frame 1 includes left and right sidewalls defining the hollow interior 12. Each of the left and right sidewalls of each frame 1 includes at least two insertion grooves 17 spaced from each other in a vertical direction. An insertion plate 19 is mounted between two aligned insertion grooves 17 respectively of the left and right sidewalls of each frame 1. Each insertion plate 19 has a plurality of vents 18. The vents 18 of an upper one of two adjacent insertion plates 19 are not aligned with the vents 18 of a lower one of the two adjacent insertion plates 19, as shown in FIGS. 4 and 5. Thus, the insertion plates 19 can stop rainwater and can prevent the rainwater from being blown into the inside of the housing. Each insertion plate 19 can have substantially slanted L-shaped cross sections and extend downward, as shown in FIG. 6.

Figure 3:
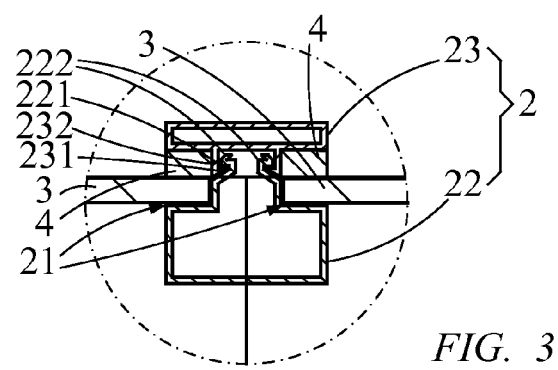
FIG. 3 is an enlarged view of a circled portion A of FIG. 2.

The connecting members 2 interconnect the frames 1. Each connecting member 2 includes a groove 21 in at least one side thereof. Two adjacent connecting members 2 respectively have two mutually facing grooves 21. Each of two outermost connecting members 2 has only one groove 21. In a middle connecting member 2, a groove 21 is defined in each side of the connecting member 2. Preferably, each connecting member 2 includes a base 22 and a cover 23 coupled to the base 22. In the example shown in FIG. 3, the base 22 includes two vertical boards 222 protruding toward the cover 23. Each vertical board 222 has a retaining portion 221. The cover 23 includes two plates 232 protruding toward the base 22. Each plate 232 has a hook 231. Each hook 231 of the cover 23 engages with one of the retaining portions 221 of the base 22 to couple the base 22 to the cover 23.

Each shielding plate 3 is mounted between two adjacent connecting members 2 and is fixed to upper ends of the frames 1 to cover the ventilation space 11. Each shielding plate 3 includes front and rear ends respectively engaged in two mutually facing grooves 21 respectively of two adjacent connecting members 2 and bonded to the two adjacent connecting members 2 by silicon glue 4. The shielding plates 3 are preferably light-transmittable boards, such as glass or transparent plastic boards, such that light can enter the ventilation space 11. The interior of the housing can be brighter to save the electricity for illumination.

In brief, the frames 1 are fixed to left and right sides of the roof 10, with the frames 1 defining a ventilation space 11 in communication with the inside of the house including the roof 10. Each frame 1 includes a hollow interior 12, at least one lower opening 13 communicating the hollow interior 12 with the outside of the house, and at least one vent 14 communicating the hollow interior 12 with the ventilation space 11. The high-temperature air in the inside of the housing can flow to the outside via the ventilation space 11, the vents 14, the hollow interiors 12, and the lower openings 13 of the frames 1 to reduce the indoor temperature of the housing. Furthermore, the shielding plates 3 are light-transmittable boards, such as glass or transparent plastic boards, such that light can enter the ventilation space 11. The interior of the housing can be brighter to save the electricity for illumination, reducing consumption of energy and, hence meeting the green construction idea of saving energy and reducing emission of carbon. The residential quality of the building is, thus, increased.

Although specific embodiments have been illustrated and described, numerous modifications and variations are still possible without departing from the scope of the invention. The scope of the invention is limited by the accompanying claims.

The invention claimed is:

1. A heat dissipating structure for an iron-sheet house comprising:

two frames adapted to be fixed to left and right sides of a roof, with the two frames defining a ventilation space in communication with an inside of the iron-sheet house including the roof, with each of the two frames including a hollow interior, at least one lower opening communicating the hollow interior with an outside of the iron-sheet house, and at least one vent communicating the hollow interior with the ventilation space;

a plurality of connecting members interconnecting the two frames, with each of the plurality of connecting members including a groove in at least one side thereof, with two adjacent connecting members respectively having two mutually facing grooves; and a shielding plate mounted between two adjacent connecting members and fixed to upper ends of the two frames to cover the ventilation space, with the shielding plate including front and rear ends respectively engaged in the two mutually facing grooves respectively of the two adjacent connecting members and bonded to the two adjacent connecting members by silicon glue;

with each of the two frames including a flat lower edge having first and second sides located on opposite sides of the at least one lower opening, with a first dashboard extending downward from the first side of the flat lower edge of each of the two frames, with a second dashboard extending downward from the second side of the flat lower edge of each of the two frames, with a length of the first dashboard between the flat lower edge of each of the two frames and a bottom of the first dashboard being larger than a length of the second dashboard between the flat lower edge of each of the two frames and a bottom of the second dashboard;

with each of the two frames including left and right sidewalls defining the hollow interior, with each of the left and right sidewalls of each of the two frames including at least two insertion grooves spaced from each other in a vertical direction, with an insertion plate mounted between two aligned insertion grooves respectively of the left and right sidewalls of each of the two frames, with each insertion plate having a plurality of vents, with the plurality of vents of an upper one of two adjacent insertion plates not aligned with the plurality of vents of a lower one of the two adjacent insertion plates;

with each insertion plate having substantially slanted L-shaped cross sections and extending downward.

2. The heat dissipating structure for the iron-sheet house as claimed in claim 1, with each of the plurality of connecting members including a base and a cover coupled to the base, with the base including two vertical boards protruding toward the cover, with each of the two vertical boards having a retaining portion, with the cover including two plates protruding toward the base, with each of the two plates having a hook, with each hook of the cover engaged with one of the retaining portions of the base to couple the base to the cover.

* * * * *